Aug. 16, 1927.

W. T. HENSLEY 1,639,504

PULLEY

Filed Aug. 1, 1924

Inventor
Wm. T. Hensley
Lloyd L. Evans
By
Attorney

Aug. 16, 1927.

W. T. HENSLEY 1,639,504

PULLEY

Filed Aug. 1, 1924

Inventor
Wm. T. Hensley
Lloyd L. Evans
Attorney

By

Patented Aug. 16, 1927.

1,639,504

UNITED STATES PATENT OFFICE.

WILLIAM T. HENSLEY, OF INDIANAPOLIS, INDIANA.

PULLEY.

Application filed August 1, 1924. Serial No. 729,437.

This invention relates to the manufacture of pulleys, and more particularly to those constructed from laminæ of suitable material, such as strawboard and the like, so that the edges of the laminæ of fibrous material are presented at the surface of the pulley to form a frictional surface.

It is an object of the invention to provide a laminated pulley, preferably of the paper type, in which the laminated material is more dense at the inner portion than upon the outer surface, thus providing a relatively soft and maximum frictional surface for engagement with a belt, and a relatively dense inner portion having a maximum mechanical strength.

Another object of the invention is to provide a laminated pulley composed of parts which can be cheaply manufactured and which can be quickly and easily assembled to form the pulley.

A further object of the invention is to provide a laminated pulley in which the laminæ forming the body of the pulley are assembled upon and securely fastened to a hub.

With the above and other objects in view the invention may be said to comprise the laminated pulley as illustrated in the accompanying drawings, hereinafter described and particularly set forth in the appended claims together with such variations and modifications thereof as will be apparent to those skilled in the art to which the invention appertains.

Reference should be had to the accompanying drawings forming a part of this specification in which, Figure 1 is a sectional view taken on an axial plane through a pulley embodying the invention.

In an earlier application Serial No. 610,175, filed, January 2, 1923, I have disclosed a laminated pulley in which the center portion of the pulley is formed of alternate laminæ of metal and fibrous material compressed to such density that it may be bored to the size of the shaft to which the pulley is to be applied. The present invention provides a laminated pulley which is very economical to manufacture when large numbers of pulleys are to be made of a given size of central bore and does away with the necessity of the metal laminæ though of course they may be used if desired.

Figure 1:
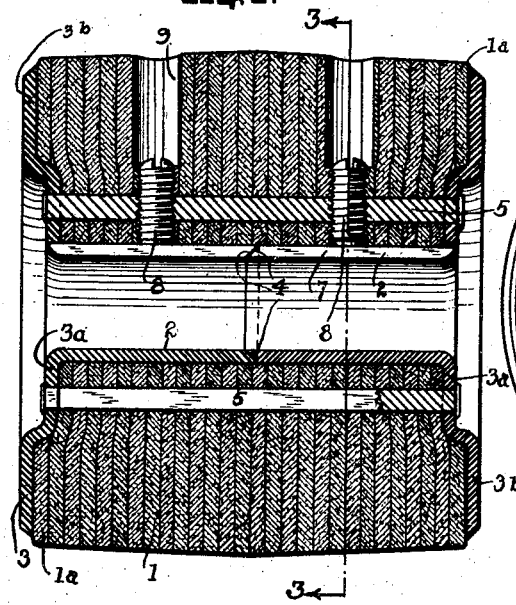
Figure 2:
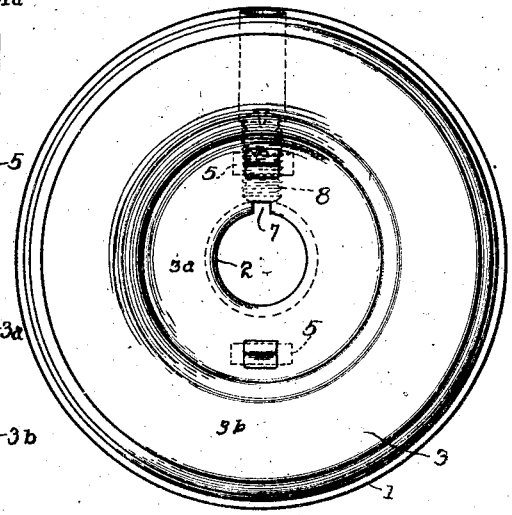
Fig. 2 is an end elevation of the pulley.
Figure 3:
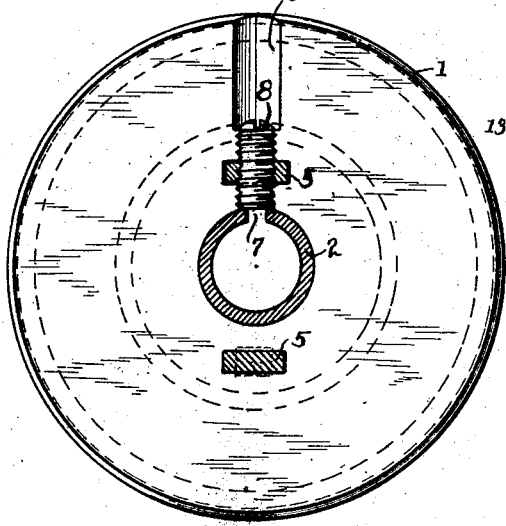
Fig. 3 is a cross section taken on line 3—3 of Fig. 1.

Referring to the accompanying drawings, Figs. 1 to 3 show a pulley in which the body is composed entirely of laminæ of fibrous material such as strawboard, paper, or other suitable material, the laminated body of the pulley being rigidly secured upon a tubular flanged hub formed of a pair of stampings, each consisting of a tubular body portion 2 and a flange portion 3. The laminæ 1 are in the form of plates of an internal dimension such that they may be slipped over and fit snugly upon the tubular body portions 2 of the hub members. The tubular portions of the hub members are received by the axial openings of the plates and may abut or overlap at their inner ends as desired. As shown in Fig. 1, the inner ends of the tubular portions of the hub members are beveled at 4 to provide an interfitting engagement which serves to hold the sections of the hub in alinement. The hub members and the laminated body are secured together by means of rivet bars 5 extending between the flanges 3 and through the laminæ 1 preferably near the tubular body of the hub. The bars 5 are preferably flat bars disposed with their side faces at right angles to a radial plane and are shouldered adjacent their ends to engage the inner faces of the end flanges 3 and have reduced ends projecting through the flanges and headed over to rigidly secure the members in place.

The end flanges 3 are preferably depressed, as at 3ª, to form recesses in both ends of the pulley so that the heads of the rivets will not project outwardly beyond the ends of the pulley. The outer portions 3ᵇ of the flanges form smooth flat surfaces at the ends of the pulley. The laminæ 1 are tightly compressed between the portions 3ª of the flanges 3 and preferably less tightly compressed between the outer portions 3ᵇ and thus the laminated body is relatively dense adjacent the hub and relatively soft at the periphery to provide an effective frictional surface for power transmission. If the portions 3ª of the ends 3 are recessed sufficiently deeply, it is sometimes preferable to provide additional laminæ 1ª, as shown in Fig. 1, which laminæ are annular and fill in between the laminæ extending through the tubular hub and the outer portions $3^b$ of the end flanges 3. The end flanges 3 form the end plates of the pulley and may or may not project beyond the periphery of the laminated body depending on whether a guard flange for the belt is desired or not; the flanges, however, preferably extend at least to adjacent the periphery of the pulley to provide a rigid retainer and protector for the laminæ.

It is desirable that the laminated body be rigidly keyed to the shaft and to this end the tubular portions 2 of the hub members are provided with longitudinal slots 7 to which extend the inner ends of set screws 8 which are inserted from the periphery of the pulley through radial bores 9 extending from the periphery and are screwed into threaded openings in one of the rivet bars 5. The slots 7 serve as a keyway to receive the key on the shaft in which the pulley is mounted.

Figure 4:
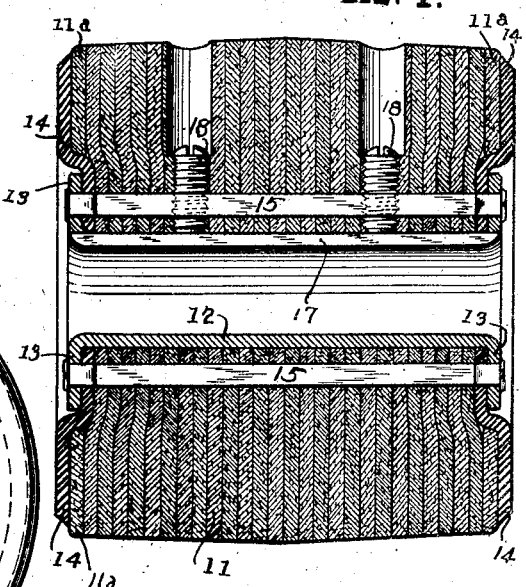
Figs. 4, 5 and 6 are sectional views, each taken on an axial plane and each showing a different modification of the invention.

Figure 4 shows a modified form of the invention in which the tubular portion of the hub is integral from end to end. In this modification the laminæ 11 are mounted upon a tube 12 which has short outturned flanges 13 at its ends, which engage and retain the end plates 14. The end plates 14 are annular in form and have their inner portions offset inwardly and lying within the outturned flanges 13 of the tube 12. The tube 12 may be flanged at one end only prior to the assembly of the pulley and the laminæ may be positioned thereon and compressed. The second flange 13 may be formed by spinning or by a suitable application of pressure.

Rivet bars 15 extend through the end plates 14 and flanges 13 and through the laminæ, said bars preferably having shoulders engaging the inner faces of the end plates 14 and reduced ends passing through the plates 14 and flanges 13 and headed over on the outer faces of the flanges 13. The end plates 14 have substantially the same form as the end flanges 3 in the modification first described so that the heads of the rivet bars and the flanges 13 are in a central depression at the ends of the pulley and flat end faces are provided by the outer portions of the plates 14. Additional laminæ $11^a$ are provided to fill the space between the outer portions of the plates 14 and the main laminæ 11. The plates 14 extend to adjacent the periphery of the pulley and are preferably beveled at their periphery to avoid an abrupt shoulder at the end of the pulley.

The tube 12 is provided with a slot 17 extending from end to end therein which serves as a keyway to receive a key carried by the shaft on which the pulley is to be mounted. The set screws 18 are located in radial bores in the body of the pulley and preferably pass through threaded apertures on one of the rivet bars which is of a thickness to afford sufficient threads to firmly hold them.

Figure 5:
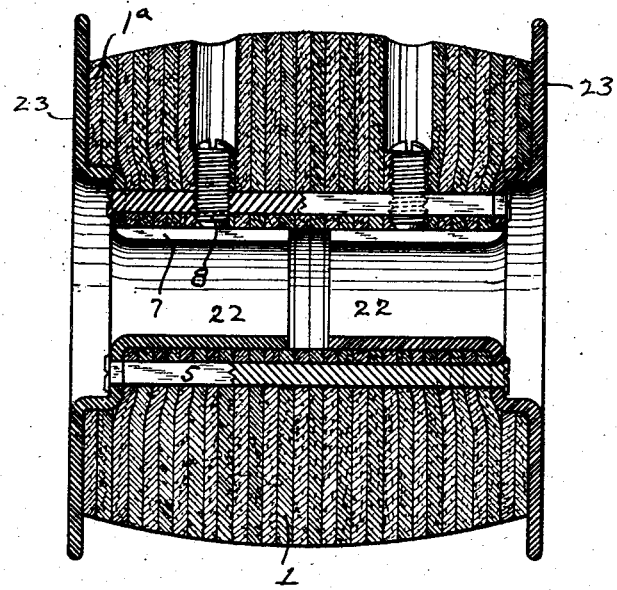

In Fig. 5 there is shown a modification in which the pulley is quite similar to that shown in Figs. 1 to 3. The tubular portions 22 of the hub members, however, do not abut each other and thus these hub members are adapted to be used for pulleys of various lengths of face. In this modification the flanges 23 of the hub members are of greater diameter than the pulley so that they project beyond the periphery of the laminated body portion and thus form guards for retaining a belt.

Figure 6:
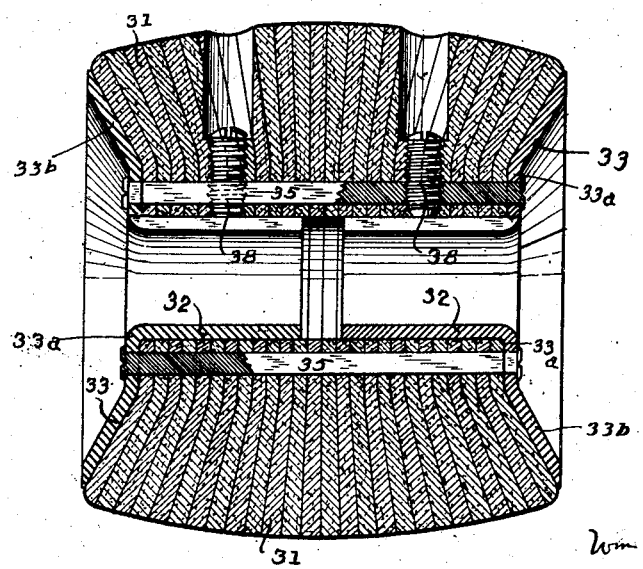

Figure 6 of the drawing shows a modification in which the fillers at the ends of the pulley are eliminated, all of the laminæ 31 extending from the tubular portion of the hub to the periphery of the pulley. The hub comprises a pair of stampings having tubular portions 32, at the outer ends of which are the flaring outwardly extending flanges 33 forming the end plates integral with the hub, the laminated body being secured upon the tubular portions 32 and between the end flanges 33. The hub members and laminated body are secured together by means of rivet bars 35, suitable set screws 38 being provided as previously described. The end flanges 33 have inner portions $33^a$ which extend outwardly a short distance at right angles to the axis to receive the ends of the rivet bars, and outer portions $33^b$ which are shown as inclining outwardly to provide flaring ends.

In this form there is no need for filler plates and the inner portion of the pulley is compressed, forming a relatively dense inner portion having a maximum mechanical strength for engagement with a shaft and an outer portion providing a relatively soft frictional surface for engagement with a belt. It will be noted that in this form the end plates are easily formed and the assembly is easily compressed to form a pulley having the above desirable characteristics.

While the pulleys shown in the drawings are indicated as having crown surfaces, that is of slightly greater diameter in the central portion than adjacent the end, it is perfectly obvious that the outer surface of the fibrous laminæ may be trimmed in finishing the pulley to be cylindrical or any other desired contour.

It will be seen that the end plates of any of the pulleys shown in this application may either have a flaring outer portion, such as shown in Fig. 6, or may have the outer portion of the end plate bent back upon itself so that it is substantially parallel with the inner portions of the end plate which are at right angles to the axis of the pulley and between which the laminæ are compressed.

In any of these forms the portions of the end plates between which the laminæ are pressed may be termed inwardly, offset portions and when the end plates are forced together by pressure it obviously follows that the inner portions of the laminæ will be compressed more than the outer portions and, therefore, become relatively dense.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A pulley for power transmission comprising fibrous laminæ of compressible material, a pair of sheet metal tubular hub members each carrying an end plate, said end plates each having inwardly extending portions of less diameter than the fibrous laminæ, and shouldered rivets for holding said end plates against relative movement in each direction axially of the pulley, whereby said fibrous laminæ when compressed will have a relatively dense inner portion and a relatively soft, frictional outer portion.

2. A pulley for power transmission comprising a tubular hub of sheet metal carrying end flanges, fibrous laminæ mounted upon said hub, said end flanges having inwardly extending portions of less diameter than the fibrous laminæ, said fibrous laminæ being substantially compressed between said inwardly extending portions of the end flanges, and means connecting said end flanges for holding them against relative longitudinal movement.

3. A pulley having a hub formed of two members each having a tubular portion provided with a longitudinal slot in its wall, and an outer flanged end, a body formed of laminæ of fibrous material surrounding said tubular portion of the hub members and arranged side by side, a rivet for extending through the laminæ and secured to the end flanges of the hub, and set screws carried by the rivet bar and engaging in the slots of the sections.

4. A pulley having a hub formed with a tubular portion provided with a longitudinal keyway and end flanges, a body formed of laminæ of fibrous material arranged side by side, a rivet bar connecting the end flanges and extending through the laminæ, and set screws carried by the bar to engage said keyway.

5. A pulley for power transmission comprising fibrous laminæ of compressible material, a tubular hub carrying end plates having inwardly extending portions of less diameter than the fibrous laminæ, whereby movement of the end plates toward each other to compress the fibrous laminæ will cause the latter to have a relatively dense inner portion and a relatively soft, frictional, outer portion, and means extending through the fibrous laminæ for holding the end plates against relative movement axially of the pulley.

6. A pulley for power transmission comprising a hub formed of two pressed sheet metal members each having a tubular hub portion and an annular flanged disc member formed on one end of the tubular portion and arranged at an angle thereto, a body portion formed of fibrous laminæ arranged side by side and surrounding the tubular portions of said hub, said annular disc members each having a portion of considerably less radial dimension than said laminæ extending outwardly substantially at right angles to said tubular portion, and a portion extending outwardly radially and longitudinally of said body, and means for rigidly securing said flanged disc members together against relative movement comprising a plurality of rivet bars completely embedded in the laminæ of the pulley and each having a shouldered head portion adapted to space the hub members and to rigidly connect these members against lateral and circumferential movement in each direction.

In testimony whereof, I hereunto affix my signature.

WILLIAM T. HENSLEY.